(12) United States Patent
    Terleski et al.

(10) Patent No.: US 8,152,234 B2
(45) Date of Patent: Apr. 10, 2012

(54) AMENITY POCKET

(75) Inventors: Timothy W. Terleski, Richardson, TX (US); Staci Ault Mininger, Garland, TX (US); Rik Westerink, Corinth, TX (US)

(73) Assignee: Weber Aircraft LLC, Gainesville, TX (US)

( * ) Notice: Subject to any disclaimer, the term of this patent is extended or adjusted under 35 U.S.C. 154(b) by 79 days.

(21) Appl. No.: 12/750,112

(22) Filed: Mar. 30, 2010

(65) Prior Publication Data
    US 2010/0244506 A1    Sep. 30, 2010

Related U.S. Application Data

(60) Provisional application No. 61/164,541, filed on Mar. 30, 2009.

(51) Int. Cl.
    *A47C 7/62* (2006.01)
(52) U.S. Cl. .................................. 297/188.04
(58) Field of Classification Search ............. 297/188.07, 297/188.04, 188.16, 188.17, 188.05, 188.06, 297/452.65; 224/275; 296/37.8, 37.15
    See application file for complete search history.

(56) References Cited

U.S. PATENT DOCUMENTS

| | | | | |
|---|---|---|---|---|
| 333,853 A * | 1/1886 | Handy | | 297/146 |
| 365,326 A * | 6/1887 | Abramson | | 297/188.03 |
| 1,276,713 A * | 8/1918 | Biedma | | 297/164 |
| 1,527,056 A * | 2/1925 | Martin | | 224/572 |
| 1,646,266 A * | 10/1927 | Stoner | | 224/282 |
| 2,841,211 A | 7/1958 | Thompson | | |
| 5,292,174 A * | 3/1994 | Ohnuma | | 297/188.07 |
| 5,695,240 A * | 12/1997 | Luria | | 297/163 |
| 7,371,341 B2 * | 5/2008 | Youngs et al. | | 264/238 |
| 2005/0218708 A1 | 10/2005 | Gramss | | |

FOREIGN PATENT DOCUMENTS

| | | |
|---|---|---|
| DE | 1961565 | 6/1971 |
| DE | 102004016255 | 8/2005 |
| FR | 2613299 | 10/1988 |
| JP | 60110544 | 6/1985 |
| JP | 06048252 A * | 2/1994 |

* cited by examiner

*Primary Examiner* — Milton Nelson, Jr.
(74) *Attorney, Agent, or Firm* — Dean W. Russell; Tiffany L. Williams; Kilpatrick Townsend & Stockton LLP

(57) ABSTRACT

Embodiments of the present invention include an amenity pocket comprising a rigid structure, a vehicle surface, and a deployment mechanism. The deployment mechanism provides a non-zero deployment angle of the rigid structure relative to the vehicle surface. In some embodiments, the amenity pocket is coupled to a passenger seat back. In other embodiments, a mounting structure comprising a base may be pivotally coupled to the base of the rigid structure and coupled to the vehicle surface. An interior surface of the rigid structure may be coupled to a filler. In some embodiments, the filler may be coupled to a protective surface. In other embodiments, an exterior surface of the rigid structure may be coupled to a cover.

22 Claims, 5 Drawing Sheets

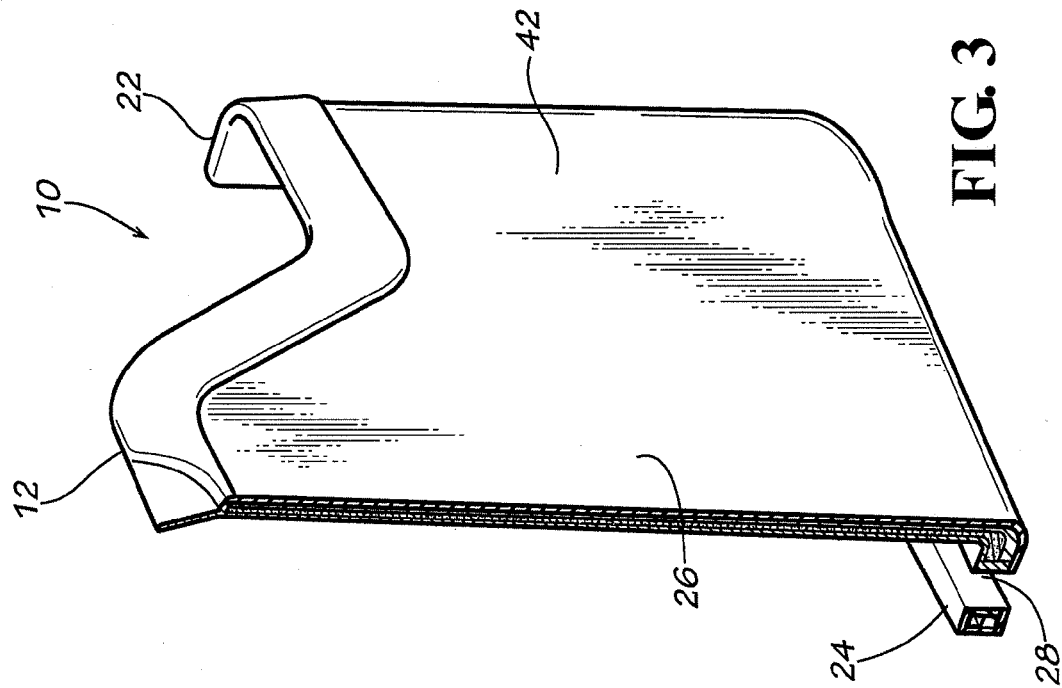
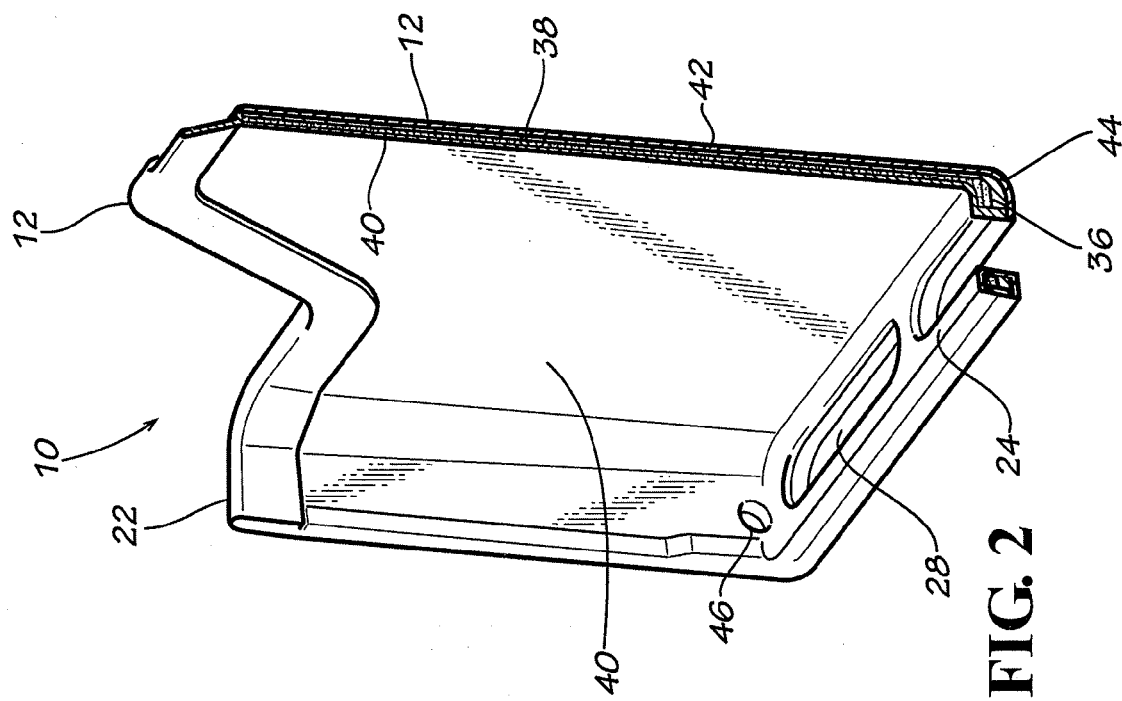

AMENITY POCKET

CROSS REFERENCE TO RELATED APPLICATIONS

This application is related to and claims priority benefits from U.S. Provisional Application Ser. No. 61/164,541, filed on Mar. 30, 2009, entitled BACK MOUNTED STORAGE COMPARTMENT. The '541 application is hereby incorporated in its entirety by this reference.

FIELD OF THE INVENTION

The field of the invention relates to amenity pockets for passenger seats or the like.

BACKGROUND

Many vehicle seats such as those on passenger aircraft, buses, trains and the like have installed thereon a pocket for the convenient storage of literature, games, puzzles, and other entertainment objects. These pockets have traditionally been designed to provide minimal protection to the objects themselves and to accommodate objects of a size and/or weight equal to or lesser than a typical book or other literature.

In some circumstances, it may be desirable to utilize the pocket storage of passenger seats to store items requiring greater volume and/or load bearing capacity than what has traditionally been provided by these pockets. In some instances, it may also be desirable to improve the stiffness and protection capability provided by these pockets as well as to store various kinds of objects such as personal computers, portable DVD players, E-book readers, and other electronic devices that may require more protective storage than is offered by current pocket designs.

SUMMARY

Embodiments of the present invention include an amenity pocket comprising a rigid structure, a vehicle surface, and a deployment mechanism. The rigid structure includes a back, a base, and two sides. The deployment mechanism may include at least two gussets, wherein each gusset is coupled to the vehicle surface and coupled to one side of the rigid structure. In some embodiments, the deployment mechanism provides a non-zero deployment angle of the rigid structure relative to the vehicle surface. In some embodiments, the amenity pocket is coupled to a passenger seat back. In other embodiments, a mounting structure comprising a base may be pivotally coupled to the base of the rigid structure and coupled to the vehicle surface.

An interior surface of the rigid structure may be coupled to a filler. In some embodiments, the filler may be coupled to a protective surface. In other embodiments, an exterior surface of the rigid structure may be coupled to a cover.

The amenity pocket may be deployed by providing a vehicle surface, pivotally coupling the vehicle surface to the base of the rigid structure, providing a deployment mechanism that sets a deployment angle of the rigid structure relative to the vehicle surface, providing a latch to releasably couple the rigid structure to the vehicle surface, releasing the latch to disengage the rigid structure from the vehicle surface, and rotating the rigid structure to the deployment angle.

BRIEF DESCRIPTION OF THE DRAWINGS

FIG. 2 is a cross-sectional perspective view of the interior side of the amenity pocket of FIG. 1.

FIG. 3 is a cross-sectional perspective view of the exterior side of the amenity pocket of FIG. 1.

DETAILED DESCRIPTION

Figure 1:
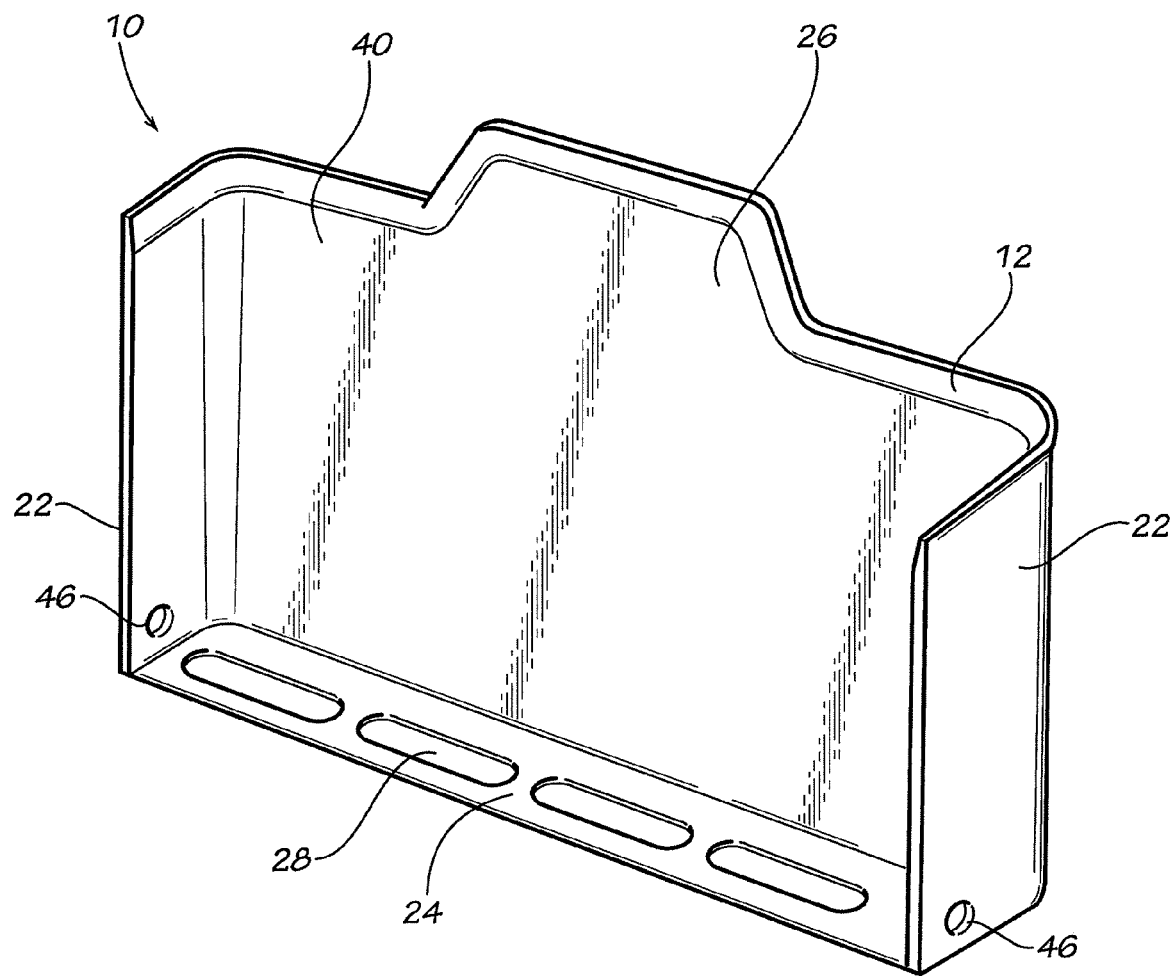
FIG. 1 is a perspective view of an amenity pocket according to one embodiment of the present invention.

Embodiments of the invention provide amenity pockets for use with a vehicle seat. While the amenity pockets are discussed for use with aircraft seats, they are by no means so limited. Rather, embodiments of the amenity pockets may be used in vehicle seats of any type. Similarly, the amenity pockets may be mounted to vehicle walls, bulkheads, or otherwise as appropriate or desired.

FIGS. 1-4 illustrate one embodiment of an amenity pocket 10. In this embodiment, the amenity pocket 10 comprises a rigid structure 12, a deployment mechanism 16, and a hinge 54. A latch 20 may be used to retain the amenity pocket 10 in a stowed position.

Figure 7:
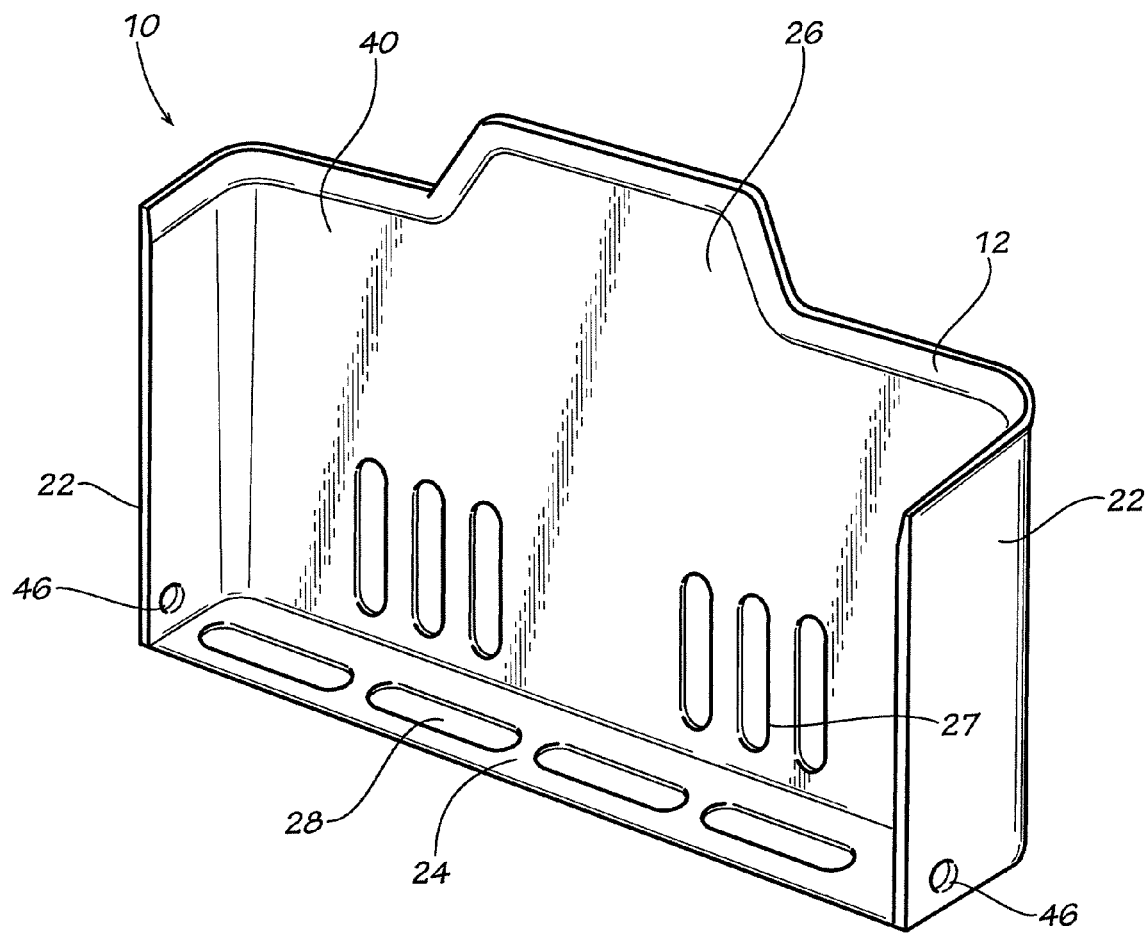
FIG. 7 is a perspective view of an amenity pocket of according to another alternative embodiment of the present invention.

The rigid structure 12 provides the shape of the amenity pocket 10. The rigid structure 12 comprises two sides 22, a base 24, and a back 26. In some embodiments, the base 24 includes a plurality of apertures 28. These apertures 28 may provide ventilation into the amenity pocket 10, as well as providing clean-out holes so that undesirable trash and debris does not become lodged in the bottom of the amenity pocket 10. In an alternative embodiment shown in FIG. 7, the back 26 may also include a plurality of apertures 27. These apertures 27 may provide ventilation into the amenity pocket 10, as well as providing visual inspection holes for passengers to confirm that no personal items remain in the amenity pocket 10 when preparing to disembark from the vehicle.

Figure 4:
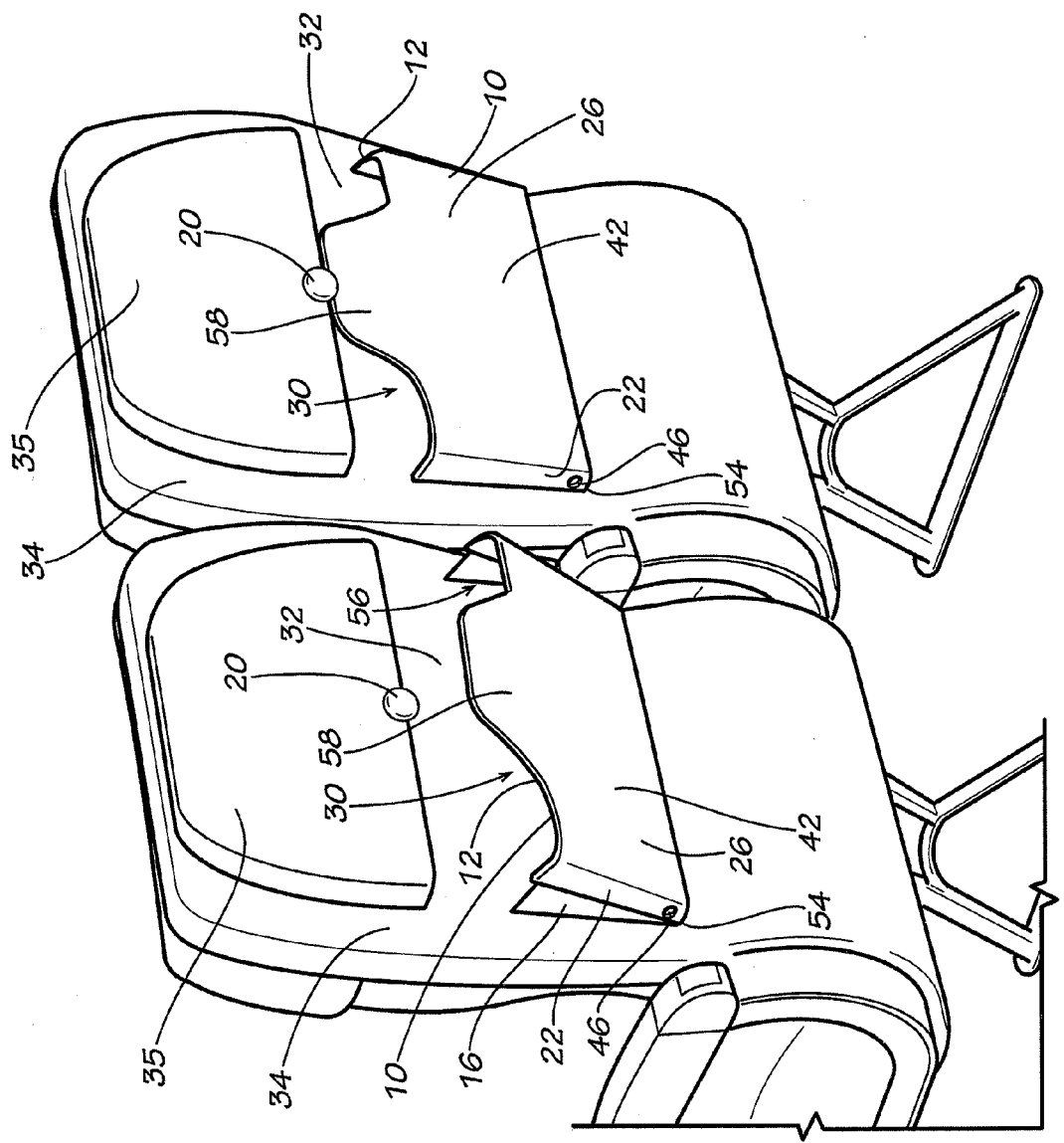
FIG. 4 is a perspective view of two amenity pockets of FIG. 1 in deployed and stowed positions, respectively.
Figures 5, 6:
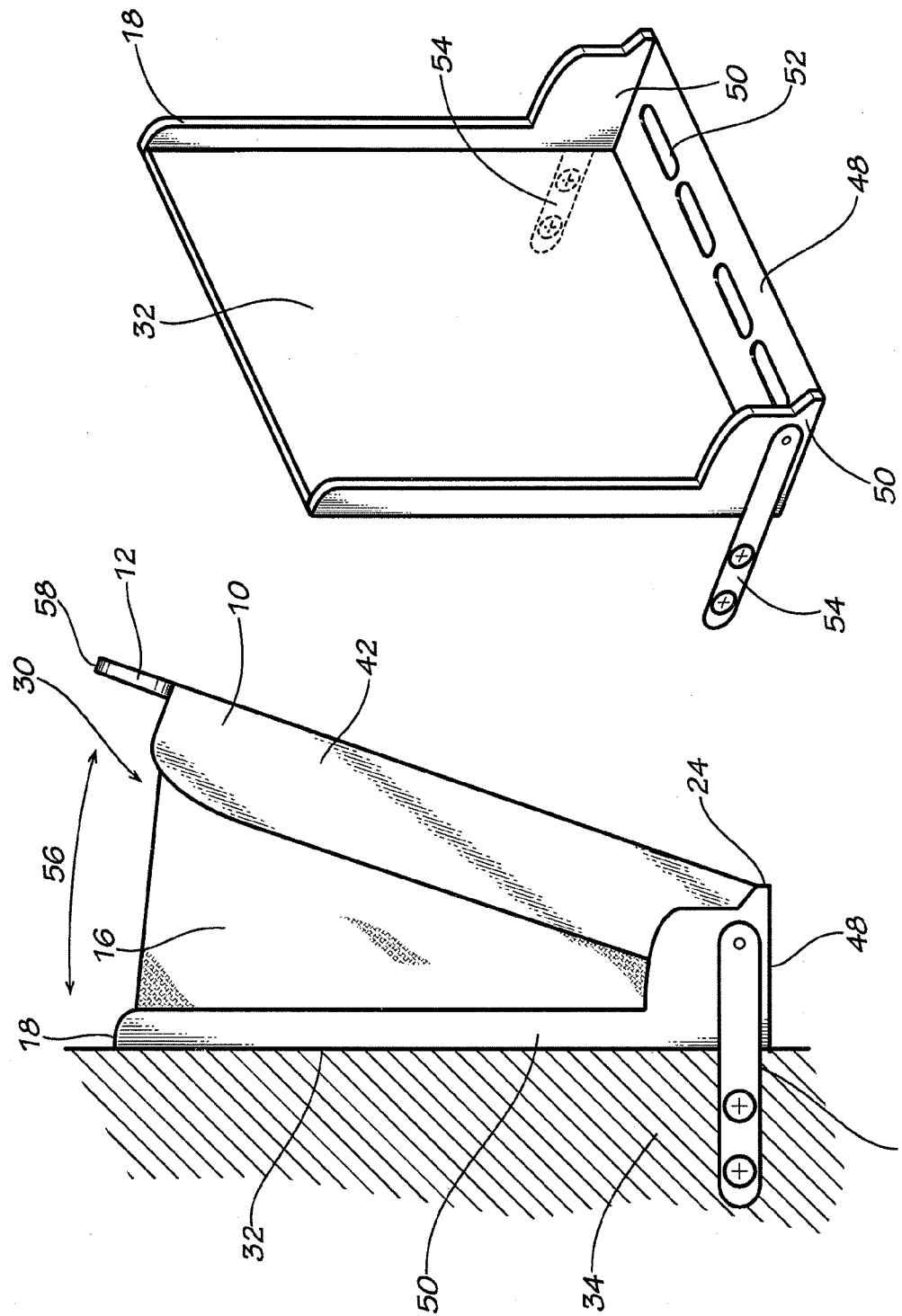
FIG. 5 is a side view of an amenity pocket of according to an alternative embodiment of the present invention.
FIG. 6 is a perspective view of a mounting structure that is coupled to the amenity pocket of FIG. 5.

The rigid structure 12 may have any shape that encloses an area 30 formed between the amenity pocket 10 and a surface 32 to which the amenity pocket 10 is mounted. In some embodiments, the surface 32 is a surface within a vehicle. In other embodiments, as shown in FIG. 4, the surface 32 is a rear surface of a passenger seat 34. In yet other embodiments, as shown in FIGS. 5 and 6, the surface 32 may be a back surface of a mounting structure 18.

In the embodiments where the surface 32 is a rear surface of the passenger seat 34, the rigid structure 12 may be positioned between the surface 32 and a tray table (not shown). In other embodiments, as shown in FIG. 4, the rigid structure 12 may be positioned on the surface 32 in a location where a tray table is typically mounted. The rigid structure 12 may also be positioned on the surface 32 below an area 35. In some embodiments, the area 35 may include a video display or other equipment for passenger input or viewing.

The depth of the area 30 is determined generally by the length of each side 22 of the rigid structure 12. The sides 22, base 24, and back 26 may have any suitable shape including rectilinear, curved, angled, or other similar shape. The rigid structure 12 may be formed of materials including but not limited to aluminum, sheet metal, stainless steel, other metallic material, composite material, injection molded or thermoformed plastic, or other similar material that provides sufficient strength to withstand a desired load.

In some embodiments, an interior surface 36 of the rigid structure 12 is coupled to a filler 38. The filler 38 may be formed of materials including but not limited to viscoelastic materials, foam materials, or other similar materials. The filler 38 and the interior surface 36 may be coupled in any suitable manner including but not limited to glue, mechanical fasteners, or other appropriate chemical or mechanical means. The filler 38 creates a resilient surface to lessen the impact force created when objects stored with the amenity pocket 10 come into contact with the rigid structure 12.

In some embodiments, the filler 38 may be coupled to a protective surface 40. The protective surface 40 may be formed of materials including but not limited to leather, vinyl, felt, cloth, plastic, woven fabrics, non-woven fabrics, synthetic fabrics, or other similar materials. The protective surface 40 and the filler 38 may be coupled in any suitable manner including but not limited to glue, mechanical fasteners, or other appropriate chemical or mechanical means. The protective surface 40 is designed to provide additional protection for items stored within the amenity pocket 10.

A cover 42 may be coupled to an outer surface 44 of the rigid structure 12. The cover 42 may be formed of materials including but not limited to leather, vinyl, felt, cloth, plastic, woven fabrics, non-woven fabrics, synthetic fabrics, or other similar materials. The cover 42 and the outer surface 44 may be coupled in any suitable manner including but not limited to glue, mechanical fasteners, or other appropriate chemical or mechanical means.

In some embodiments, as shown in FIG. 4, the rigid structure 12 is pivotally coupled directly to the surface 32. In these embodiments, the hinge 54 is coupled to an aperture 46 positioned near the base of each side 22. In other embodiments, the hinge 54 may be located in the center along the base 24 of the rigid structure 12 or any other suitable attachment location that allows the rigid structure 12 to pivot relative to the surface 32. In these embodiments, each side 22 of the rigid structure 12 is coupled directly to the surface 32 via the deployment mechanism 16. In some embodiments, the deployment mechanism 16 may include but is not limited to gussets, wherein the gussets may be formed of materials including but not limited to leather, cloth, plastic, woven fabrics, non-woven fabrics, and synthetic fabrics.

In an alternative embodiment, as shown in FIGS. 5 and 6, the rigid structure 12 is pivotally coupled to the mounting structure 18, wherein the mounting structure 18 comprises a back portion that forms the surface 32, and the mounting structure 18 is in turn coupled to the passenger seat 34 or other vehicle surface. The mounting structure 18 includes a base 48 and two sides 50. The mounting structure 18 may be formed of materials including but not limited to sheet metal, stainless steel, other metallic material, composite material, or other similar material that provides sufficient strength to withstand a desired load.

In this alternative embodiment, the base 48 of the mounting structure 18 is positioned below the base 24 of the rigid structure 12. The base 48 of the mounting structure 18 may have any suitable shape including rectilinear, curved, angled, or other similar shape. The base 48 may also include a plurality of apertures 52 that align with the plurality of apertures 28 of the base 24 of the rigid structure 12. These apertures 52 also provide ventilation into the amenity pocket 10, as well as providing clean-out holes to so that undesirable trash and debris does not become lodged in the bottom of the amenity pocket 10.

In some embodiments, at least a portion of the sides 50 of the mounting structure 18 may have substantially the same width as the sides 22 of the mounting structure 18. In these embodiments, the sides 50 of the mounting structure 18 may taper inward away from the base 48 to a narrower width. In other embodiments, each side 50 of the mounting structure 18 has a constant width along its length. Each side 50 of the mounting structure 18 is coupled to each side 22 of the mounting structure 18 via the deployment mechanism 16.

The side 50 of the mounting structure 18 and the side 22 of the rigid structure 12 are pivotally coupled to one another near the bases 48 and 24. In one embodiment, the hinge 54 is located on the sides of the mounting structure 18. In other embodiments, the hinge 54 may be located in the center of the mounting structure 18 or any other suitable attachment location that allows the rigid structure 12 to pivot relative to the mounting structure 18.

In the embodiments shown in FIGS. 4-6, by pivotally coupling the rigid structure 12 to the surface 32, the rigid structure 12 may pivot relative to the surface 32 so that the back 26 creates an angle of varying size relative to the surface 32. In some embodiments, the maximum angle of travel by rigid structure 12, also referred as a deployment angle 56, may include a range of 10 degrees to 90 degrees. In other embodiments, the deployment angle is limited to 15 degrees.

In some embodiments, the deployment angle 56 is provided by the deployment mechanism 16. In other embodiments, the deployment angle 56 may be limited by other means. Moreover, the deployment angle 56 may be adjusted to accommodate a variety of stops. In these embodiments, a ratcheting device or ball-detent device may be combined with the deployment mechanism 16 to allow the rigid structure 12 to be positioned at a variety of deployment angles 56. For example, the deployment angle 56 may be incremented to allow the amenity pocket 10 to also function as a table. In this embodiment, the deployment angle 56 substantially aligns the back 26 with a horizontal plane.

The amenity pocket 10 is stowed by coupling the rigid structure 12 to the surface 32 in a manner that prevents the rigid structure 12 from pivoting relative to the surface 32. In some embodiments, the rigid structure 12 includes a projection 58 that engages with the latch 20. In some embodiments, as shown in FIG. 4, the latch 20 is mounted to the surface 32. The type of engagement between the latch 20 and the projection 58 include but are not limited to the type of latch commonly used for mounted tray tables on an aircraft, a slam latch, a pivot latch, snaps, hook and loop fasteners, snap-fit, or any other suitable releasable fastening device.

The foregoing is provided for purposes of illustrating, explaining, and describing embodiments of the present invention. Further modifications and adaptations to these embodiments will be apparent to those skilled in the art and may be made without departing from the scope or spirit of the invention.

That which is claimed is:

1. An amenity pocket comprising:
    (a) a rigid structure comprising a back, two sides, and a base comprising a first edge coupled to the back, a rectilinear section extending from the first edge at an angle approximately perpendicular to the back, and a second edge positioned on the rectilinear portion opposite the first edge, wherein the rectilinear section of the base comprises a plurality of apertures;
    (b) a vehicle surface, wherein the second edge of the base of the rigid structure is pivotally coupled to the vehicle surface, and the vehicle surface is shaped so that the vehicle surface does not overlap the rectilinear section of the base; and (c) a deployment mechanism, wherein the deployment mechanism provides a non-zero deployment angle of the rigid structure relative to the vehicle surface when the rigid structure is deployed.

2. The amenity pocket of claim 1, wherein the deployment mechanism comprises at least two gussets, wherein each gusset is coupled to the vehicle surface and coupled to one side of the rigid structure.

3. The amenity pocket of claim 1, wherein the deployment angle is at least 15 degrees.

4. The amenity pocket of claim 1, wherein the deployment mechanism provides for multiple deployment angles through a series of incremented stops.

5. The amenity pocket of claim 1, wherein the deployment angle substantially aligns the back of the rigid structure with a horizontal plane.

6. The amenity pocket of claim 1, further comprising a latch to releasably couple the rigid structure to the vehicle surface.

7. The amenity pocket of claim 1, further comprising a filler that is coupled to an interior surface of the rigid structure.

8. The amenity pocket of claim 7, wherein the filler is selected from a group consisting of polystyrene foam, viscoelastic materials, or high density foam.

9. The amenity pocket of claim 7, further comprising a protective surface that is coupled to the filler.

10. The amenity pocket of claim 1, further comprising a cover that is coupled to an exterior surface of the rigid structure.

11. The amenity pocket of claim 1, further comprising a mounting structure, wherein the mounting structure comprises a base that is pivotally coupled to the base of the rigid structure, and wherein the mounting structure is coupled to the vehicle surface.

12. The amenity pocket of claim 11, wherein the deployment mechanism comprises at least two gussets, wherein each gusset is coupled to a side of the mounting structure and coupled to the adjacent side of the rigid structure.

13. The amenity pocket of claim 1, wherein the vehicle surface is a passenger seat back.

14. The amenity pocket of claim 1, wherein the plurality of apertures are configured as clean-out holes to remove debris from the amenity pocket.

15. The amenity pocket of claim 1, wherein the plurality of apertures are configured as ventilation holes to remove heat from the amenity pocket.

16. A method of deploying an amenity pocket, wherein the amenity pocket comprises a rigid structure comprising a back, a base, and two sides, the method comprising the steps of:

(a) providing a vehicle surface;
(b) pivotally coupling a second edge of the base of the rigid structure to the vehicle surface, wherein the second edge is positioned on a rectilinear portion of the base opposite a first edge of the base, the first edge coupled to the back, wherein the rectilinear section extends from the first edge at an angle approximately perpendicular to the back and comprises a plurality of apertures, wherein the vehicle surface does not overlap the rectilinear section of the base;
(c) providing a deployment mechanism that provides a non-zero deployment angle of the rigid structure relative to the vehicle surface;
(d) providing a latch to releasably couple the rigid structure to the vehicle surface;
(e) releasing the latch to disengage the rigid structure from the vehicle surface, and
(f) rotating the rigid structure to the deployment angle.

17. The method of claim 16, wherein the deployment mechanism provides for multiple deployment angles through a series of incremented stops.

18. The method of claim 16, wherein the deployment angle substantially aligns the back of the rigid structure with a horizontal plane.

19. The method of claim 16, wherein the deployment mechanism comprises at least two gussets, wherein each gusset is coupled to the vehicle surface and coupled to one side of the rigid structure.

20. The method of claim 16, wherein the deployment angle is at least 15 degrees.

21. A seat for a passenger vehicle comprising:
(a) a back; and
(b) an amenity pocket comprising:
(i) a rigid structure comprising a back, two sides, and a base comprising a first edge coupled to the back, a rectilinear section extending from the first edge at an angle approximately perpendicular to the back, and a second edge positioned on the rectilinear portion opposite the first edge, wherein the rectilinear section of the base comprises a plurality of apertures, wherein the second edge of the base of the rigid structure is pivotally coupled to the back of the passenger vehicle seat, and the back of the vehicle passenger seat is shaped so that the back of the vehicle passenger seat does not overlap the rectilinear section of the base;
(ii) a deployment mechanism, wherein the deployment mechanism provides a non-zero deployment angle of the rigid structure relative to the back of the passenger vehicle seat when the rigid structure is deployed.

22. An aircraft comprising a plurality of seats of claim 21.

* * * * *